United States Patent Office 3,004,548
Patented Oct. 17, 1961

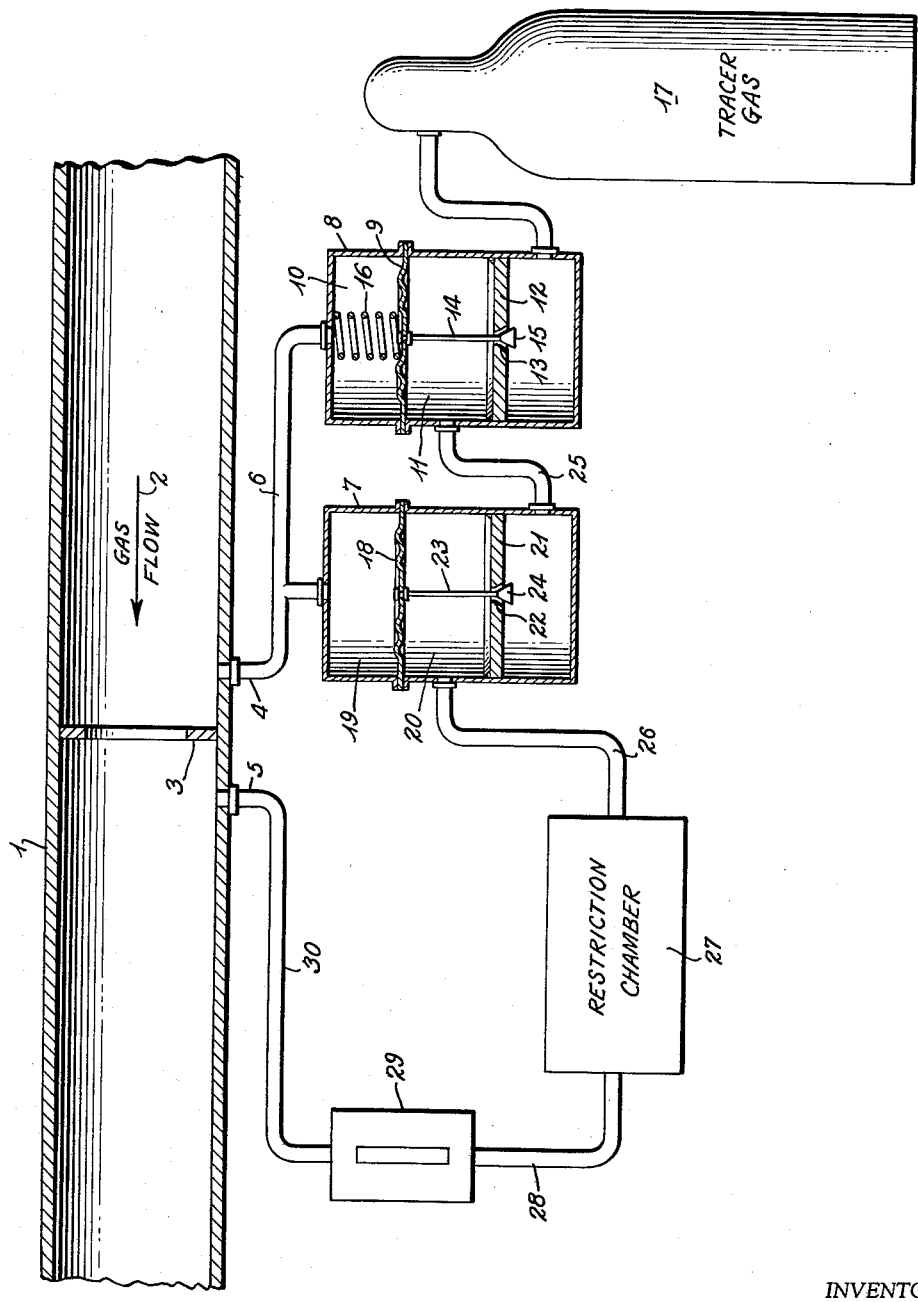

3,004,548
GAS INJECTION SYSTEM
Richard D. Janes, Nyack, N.Y., assignor to Isotopes Incorporated, Paterson, N.J., a corporation of New Jersey
Filed June 11, 1958, Ser. No. 741,335
5 Claims. (Cl. 137—100)

The present invention relates to a system for injecting small amounts of an extraneous gas (in the order of parts per million) at a uniform concentration into a flowing stream of another gas where the rate of flow and absolute pressure of the stream may vary considerably.

It has been known heretofore to add small amounts of one gas, commonly referred to as a "tracer," to a larger body of another gas, which for the sake of convenience will be referred to hereinafter as the "wild" gas. The purpose of adding the tracer gas might be to determine the path taken by the wild gas or to determine leaks in various conduits which carry the wild gas. The tracer gas is employed in conjunction with one or more instruments or devices which are capable of detecting the presence of an element or given property of the tracer gas; for example, where the tracer gas contains a radioactive element, the instrument for detecting the presence of this tracer gas might be a Geiger counter.

The system of the present invention is contemplated for use in injecting very small amounts of radioactive gas into flowing gas lines, for the purpose of tracer labeling. This is done for a variety of reasons, depending upon the particular circumstances involved. For instance, natural gas to be stored by gas companies in natural underground reservoirs (usually sand strata which originally was gas producing) can be labeled homogeneously with a radioactive gas, such as, but not limited to, tritiated methane, carbon-14 labeled methane, etc. This tracer can be utilized to conclude definitely whether or not any gas leaks observed above the ground are from this reservoir of tracer-labeled gas. For example, in those areas where coal workings are located in the same general vicinity, and where an explosion occurs in the coal workings with the possibility of a damage suit against the gas company, a test of the gas in the workings would show whether or not this gas came from the reservoir which was labeled. Likewise, breakthroughs or leaks between sand strata reservoirs could be determined.

In order to make this system of tracer labeling generally acceptable, and particularly acceptable to the gas companies, it is important that the operation involving the gas injection does not interfere with the volumes of gas that these companies handle and store in a given period of time. It has been found that most operations by the gas companies are conducted at pressures varying from 250 to 1,000 pounds per square inch, and that, for measurement and control purposes, these companies use orifice plates giving differential pressures in the order of 100 inches of water.

For the purpose of insuring accurately reproducible results, and for other obvious reasons, it is important that one should be able to inject a constant amount of tracer gas for each given quantity of gas in the stream. One should be able to accomplish this automatically even though the absolute pressure and rate of flow in the stream vary over very wide ranges.

Therefore, in light of the above, it is a principal object of the present invention to provide a system of the type referred to herein capable of injecting a constant amount of an extraneous gas per given amount of gas flowing in the stream.

Another important object of this invention is to provide a system of the type referred to above wherein the ratio of the two gases is maintained constant even though the pressure and rate of flow of the gas stream vary considerably.

A further object of the present invention is to provide a gas injection system which will not interfere with the pressure or rate of flow of the gas stream into which this extraneous gas is injected.

Other and further objects and advantageous features of this invention will hereinafter more fully appear in connection with the detailed description which follows:

In the drawing, which is a diagrammatic illustration embodying the system of the present invention, there is shown a main conduit or pipe 1 through which there is flowing a main stream of gas indicated by the arrow 2. The pipe 1 is provided with an orifice plate 3 and a pair of pressure taps 4 and 5 on opposite sides of the orifice plate. The interrelationships between the size of the pipe 1, the size of the opening in the orifice plate 3, and the location of the taps 4 and 5 are such as to constitute a "standard" orifice plate, recognized and employed by the natural gas industry for measuring flow in a pipe. This standard orifice has the property of producing a pressure differential across the orifice which is proportional to the square of the gas flow through the orifice. Therefore, if the pressure differential across the orifice is designated as $\Delta P_1$ and, if the flow of gas through the orifice is represented by $f_1$, the following equation can be set up:

$$\Delta P_1 = K_1 f_1^2$$

($K_1$ is a constant associated with the pipe 1.)

The line 6 leading from the upstream tap 4 connects in parallel with two regulator valves 7 and 8 of the diaphragm type. Regulator valve 8 is provided with a diaphragm 9 which extends transversely across the inside of the valve dividing the same into upper and lower chambers 10 and 11 respectively, which are non-communicating with one another. Vertically midway in the chamber 11 is located a transverse plate 12 having a central conically shaped opening 13. A vertical stem 14 is attached at its upper end to the lower side of the diaphragm 9 at the approximate center thereof. A conical plug 15 is attached to the lower end of the stem 14 and is adapted to seat in the conical opening 13 depending upon the condition of the diaphragm 9 (as effected by the relative difference in pressures between chambers 10 and 11). Regulator valve 8 also includes a spring 16 in the upper chamber 10 for exerting a downward force on the diaphragm 9 which is additive to the pressure in the chamber 10. Thus the pressure in the chamber 11 would have to be higher than the pressure in the chamber 10 in order to seat the plug 15 in the opening 13 so as to close the valve 8.

A source of gas under high pressure is located in tank 17, and the outlet to tank 17 is connected to the chamber 11 of the valve 8 below the transverse plate 12. The gas in the container 17 is the tracer gas which is to be added to the gas stream 2. This tracer gas preferably contains a predetermined quantity of a radioactive element.

Regulator valve 7 is similar to regulator valve 8 except that there is no spring corresponding to the spring 16 of the regulator valve 8; regulator valve 7 includes a diaphragm 18 separating the valve into two separate chambers 19 and 20. Vertically midway in the chamber 20 is located a transverse plate 21 which contains a central conical opening 22. A stem is attached at its upper end to the lower central portion of the diaphragm 18 and a conical plug 24 is attached to the lower end of this stem 23 so as to seat in the conical opening 22 depending upon the position of the diaphragm 18. Since the regulator valve 7 has no spring loading (such as regulator valve 8) it is merely necessary that the pressure within the chamber 20 be equal to the pressure in the chamber 19 in order to close the valve. A conduit 25 connects the portion of the chamber 20 below the transverse plate 21 to the chamber 11 of the regulator valve 8 above the transverse plate 12. From the regulator valve 7, at a point communicating with the chamber 20 above the transverse plate 21, a conduit 26 connects to a restriction chamber 27 which may include any type of restriction such as capillary tubing, needle valves, etc.; preferably, however, the restriction within the chamber 27 is another so-called "standard" orifice which would be of the same type as the orifice in the pipe 1, but, of course, of a smaller size. A conduit 28 connects the outlet of the restriction chamber 27 to a flow-measuring device 29; this flow-measuring device is preferably a bubbler which is calibrated such that the volume of each bubble, at standard temperature and pressure, is known. Therefore, the volume of tracer gas added to the wild gas may be determined by counting the number of bubbles per minute and multiplying by the bubble volume.

The rate of injection of the extraneous tracer gas, as would be evidenced by the rate of bubble flow through the metering device 29, may be adjusted initially by changing the size of the restriction in the restriction chamber 27. After this rate has once been established, the unit will work automatically, increasing the quantity of injected gas when the flow of wild gas increases.

Assuming that the restriction chamber 27 includes a so-called "standard orifice," the pressure drop across the orifice can be designated as $\Delta P_2$, and the flow of gas through the orifice can be designated as $f_2$. Then the following relationship may be established with regard to this orifice:

$$\Delta P_2 = K_2 f_2^2$$

(where $K_2$ is a constant associated with the restriction chamber 27).

In this system (as it will appear hereinafter), $\Delta P_1 = \Delta P_2$ and, therefore, $K_1 f_1^2 = K_2 f_2^2$ and $$\frac{f_2}{f_1} = \sqrt{\frac{K_1}{K_2}}$$

or, in other words, the ratio of tracer gas to wild gas is a constant.

Due to the presence of the spring 16, the downward pressure exerted by the diaphragm 9 will, at all times, be slightly greater than the pressure at the upstream side of the orifice plate 3; this means that gas will be permitted to pass from the tank 17 through the opening 13 in the plate 12 until the pressure within the chamber 11 immediately below the diaphragm 9 builds up to a pressure greater than the pressure at the tap 4 by an amount equal to the downward force of the spring 16. With regard to regulator valve 7, the pressure within the chamber 19 is equal to the pressure at the tap 4, so that, as soon as the pressure in the chamber 20 reaches this same value, the valve will be closed by virtue of the engagement of the conical plug 24 in the conical seat 22. Although the pressure within the valve 8 below diaphragm 9 is slightly greater than the pressure at the tap 4 and, although this pressure is transmitted through the conduit 25 to the space in chamber 20 below the plate 21, nevertheless, the pressure within the chamber 20 between the plate 21 and the diaphragm 18 will not exceed the pressure at the tap 4 since the valve will close as soon as the pressure at this point tends to exceed the pressure at the tap 4. Thus the pressure at the upstream side of the restriction chamber 27 will be almost exactly the same as the pressure at the tap 4.

Except for the presence of the measuring device 29, the outlet or downstream side of the restriction chamber 27 is connected directly to the tap 5. Therefore, the pressure at the downstream side of the restriction chamber 27 is the same as the pressure at the tap 5. (Note: The small amount of gas flowing in the lines 28 and 30 will not practically affect the pressure at this point.) This means that the tracer gas (or extraneous gas) flows through an orifice which has the same absolute pressures at its inlet and outlet sides, and, hence, the same pressure drop across the orifice as in the case of the wild gas flowing through its respective orifice. Therefore, as indicated above, $\Delta P_2$ will be equal to $\Delta P_1$, which justifies the equation set forth above showing that the relationship between the flow of tracer gas with respect to the flow of wild gas will remain constant, regardless of the particular pressure under which the wild gas is flowing in the pipe 1.

Although the system of the present invention has been described with specific reference to an extraneous gas containing a radioactive element, it should be quite apparent that this system may be employed for the automatic volumetric injection of any type of gas whether radioactive or not, at any desired ratio, into another gas stream, whether radioactive or not.

Since that portion of the system leading from the tap 4 to the chambers 19 and 10 of the regulator valves 7 and 8, respectively, is closed, there will be no gas flow from the pipe 1 into this portion of the system and, hence, the pressure and rate of flow of the gas stream 2 will be completely unaffected by the apparatus of the present system.

Whereas the present invention has been described in particular relation to the drawing illustrated herein, it should be obvious that other and further modifications apart from those shown or suggested herein may be made within the spirit and scope of this invention.

What is claimed is:

1. A system for injecting small quantities of an extraneous gas into a flowing gas stream which comprises a conduit defining a flow path for said gaseous stream, a restriction in said conduit for providing a pressure drop thereacross, a supply of said extraneous gas under high pressure, a first regulator valve, a first diaphragm in said first valve dividing the same into first and second separate non-communicating chambers, means connecting said first chamber to a first pressure tap at the upstream side of said restriction, means connecting said second chamber to said supply of extraneous gas, an outlet connected to said second chamber, fluid closure means located with said second chamber and responsive to the movement of said first diaphragm to interrupt the fluid circuit between said supply of extraneous gas and said outlet from said second chamber when the pressure in said second chamber exceeds the pressure in said first chamber by a predetermined value, means biassing said first diaphragm so as to urge said fluid closure means towards its open position and to provide said predetermined value of pressure by which the pressure in said second chamber must exceed the pressure in said first chamber in order to urge said closure means towards its closed position, a second regulator valve, a second diaphragm in said second valve dividing the same into third and fourth non-communicating chambers, means connecting said third chamber to said first pressure tap at the upstream side of said restriction, means connecting said fourth chamber to the outlet from said second chamber of said first regulator valve, an outlet connected to said fourth chamber, a second fluid closure means located within said fourth chamber and responsive to the movement of said second diaphragm to interrupt the fluid circuit between said second and said fourth chambers when the pressure in said fourth chamber reaches the pressure of said third chamber, and a second restriction connected between the outlet of said fourth chamber and a second pressure tap at the downstream side of said first-mentioned restriction, the difference in pressure between said first pressure tap and said second pressure tap constituting the pressure drop provided by said first-mentioned restriction.

2. The improvement as set forth in claim 1 wherein the biassing means is in said first chamber and comprised of a spring bearing against the diaphragm of said first regulator valve.

3. The improvement as set forth in claim 1 wherein said first-mentioned restriction is an orifice plate whose opening is of such size relative to the size of said conduit that the pressure drop across said orifice plate is directly proportional to the square of the gas flow through said orifice.

4. The improvement as set forth in claim 3 wherein said second restriction is an orifice of the same type but of smaller size than said first-mentioned orifice.

5. The improvement as set forth in claim 1 including a metering device interposed between the outlet of said second restriction means and said second pressure tap at the downstream side of said first restriction means.

References Cited in the file of this patent

UNITED STATES PATENTS

| | | |
|---|---|---|
| 1,290,513 | Collins | Jan. 7, 1919 |
| 1,731,519 | Bastian | Oct. 15, 1929 |
| 1,753,662 | Merker | Apr. 8, 1930 |
| 1,943,039 | Randolph | Jan. 9, 1934 |
| 2,067,645 | Pinkerton | Jan. 12, 1937 |
| 2,270,304 | Jacobsson | Jan. 20, 1942 |
| 2,297,408 | Hardebeck | Sept. 29, 1942 |

FOREIGN PATENTS

| | | |
|---|---|---|
| 197,159 | Great Britain | May 10, 1923 |
| 905,794 | France | Dec. 13, 1945 |